United States Patent [19]

Caroon

[11] 4,237,860

[45] Dec. 9, 1980

[54] IMMERSIBLE SOLAR WATER HEATER

[76] Inventor: Robert S. Caroon, 3025 Benefit Rd., Chesapeake, Va. 23322

[21] Appl. No.: 941,794

[22] Filed: Sep. 12, 1978

[30] Foreign Application Priority Data

Sep. 19, 1977 [NZ] New Zealand .................. 185202

[51] Int. Cl.³ .............. F24J 3/02; E04H 3/20
[52] U.S. Cl. .......................... 126/415; 4/493; 4/172.12; 126/426
[58] Field of Search ............... 4/172, 172.11, 172.12, 4/172.13, 172.14, 172.19, 172.21; 126/415, 426

[56] References Cited

U.S. PATENT DOCUMENTS

| 3,683,428 | 8/1972 | Morris | 4/172.14 |
| 4,022,187 | 5/1977 | Roberts | 4/172.12 X |
| 4,090,496 | 5/1978 | Mallet | 126/415 |

FOREIGN PATENT DOCUMENTS

| 660246 | 2/1965 | Belgium | 4/172.12 |
| 2004656 | 8/1971 | Fed. Rep. of Germany | 4/172.12 |
| 2132213 | 1/1973 | Fed. Rep. of Germany | 4/172.12 |
| 2710313 | 9/1978 | Fed. Rep. of Germany | 126/415 |

*Primary Examiner*—Stuart S. Levy
*Attorney, Agent, or Firm*—Holman & Stern

[57] ABSTRACT

The invention consists in an immersible solar heat collecting means capable of being laid at the bottom of a pool where it can be walked upon. The substantially laminar portions of the collector each includes a surface of higher light absorbence than the other side thereof so that by folding or otherwise overlapping and rearranging the various portions a different number of higher light absorbence surfaces can be presented to the sun to heat the water at any particular time. Such an apparatus makes possible the controlled solar heating of a pool.

8 Claims, 4 Drawing Figures

IMMERSIBLE SOLAR WATER HEATER

BACKGROUND OF THE INVENTION

1. Field of the Invention

The present invention relates to improvements in or relating to apparatus for heating bodies of water such as swimming pools and methods of heating swimming pools or the like bodies of water.

2. Description of the Prior Art

Most swimming pools that are to be used require some degree of temperature control in order to maintain the same at an acceptable level for swimming, for example 74° to 85° F. Traditionally, oil fired heating has been used to transfer heat to water that is being added to the swimming pool or which is being circulated with respect to the main body of the water of the swimming pool. Other forms of heat transfer of the circulatory type are also well known. More recently, a circulatory approach has been adapted based on solar energy as the source of heat for the heat exchanger. Many different forms of solar heat collector of this type are known. However such systems require complicated plumbing and are expensive in order to maintain the same at their optimum efficiency.

It is well known that a black body will absorb electromagnetic radiation more readily than a light coloured body. It is well known too, that a certain amount of penetration of the sun's rays occurs through the water contained in a swimming pool. Such solar heat, however, is largely reflected back through the water (without substantially heating the same) by the normally favoured more attractive light coloured base of the swimming pool. Anyway to coat the bottom of the swimming pool completely with a black surface while not only making the pool unattractive to swimmers also introduces difficulties of maintaining the temperature of water in the pool below a certain level during high sunlight summers.

The use of a black surface under a film of water in order to absorb solar radiation and to pass the heat gained thereby to the water is known. For example some pools employ a black surface around the periphery thereof under a film of water for this purpose. One such pool of this type was known in Christchurch, New Zealand 20 years ago. No such construction however is attractive and fully acceptable to swimmers in such a pool. Moreover such a construction which requires special construction does not allow for a great degree of control without the use of expensive and unsightly covers. There is therefore a need for some means whereby solar energy can be simply collected and passed to water in a body of a swimming pool or the like so as to provide a base source of temperature enhancement. There should also be some amount of control of the basic enhancement. Of course with a swimming pool with an existing heating system, the amount of oil, gas or electricity used thereby would be severely limited i.e. it would only be needed to maintain the pool temperature over poor sunlight periods or where the temperature of the pool is to be boosted for some reason or other above a temperature that is not attainable by the solar heat collecting system.

It is therefore an object of the present invention to provide apparatus, means and methods which will go at least some way to meet the abovementioned desiderata or which will at least provide the public with a useful choice.

BRIEF SUMMARY OF THE INVENTION

Accordingly, in one aspect the present invention consists in a water immersible solar heat collecting means comprising a plurality of substantially laminar portions capable of being moved with respect to each other, at least some of said portions including on one side thereof a surface of higher light absorbence than the other side thereof, the construction and arrangement of the system being such that by a manipulation of the mutual positions of portions of said means varied combinations of light absorbing surfaces disposable to the sun at a particular time are obtainable. Preferably said high light absorbence surface is substantially black in colour while the side of lesser light absorbence is light in colour in comparison. Preferably the varied combinations in use are substantially laminar in nature nothwithstanding the fact that some areas may be of greater thickness than others owing to an overlying relationship between certain of said portions. Ideally each said portion is substantially rectangular (as used herein rectangular includes square) and each is hingedly connected to at least one other portion. This makes it possible therefore for there in the preferred form of the invention to be four rectangular portions with two of said portions being hingedly connected to one portion only and with the other two portions being hingedly connected to two portions, the whole arrangement being such that when said portions are not in an overlapped condition whatsoever a substantially overall rectangular shape is obtained with it being possible to present 4, 3, 2, 1 and no portion sides of higher light absorbence to the sun at any particular time while the collecting means lies on the bottom of a pool or elsewhere.

Preferably each portion is substantially rigid and is connected to another portion by a flexible hinging region of a plastics material.

In a further aspect the invention consists in a substantially laminar member having one side thereof which is more light absorbtive than the other, said sheet being capable by means of its inherent flexibility or the use of hinged regions thereof of being folded in any of a number of overlap folded arrangements so that selected arrays of different light absorbtive areas can be presented in any one direction.

The invention also consists in a method of controlling the temperature of a pool which comprises laying below the water surface thereof means having portions adapted to be more highly light absorbtive than other regions thereof, and controlling the amount of heat received from the sun by said means which is then transmitted to the pool water by controlling the amount of the more light absorbtive surfaces of said means presented to the sunlight at any particular time.

BRIEF DESCRIPTION OF SEVERAL VIEWS OF THE DRAWINGS

A preferred form of the present invention is best understood with reference to the accompanying drawings in which.

DETAILED DESCRIPTION

Figure 1:
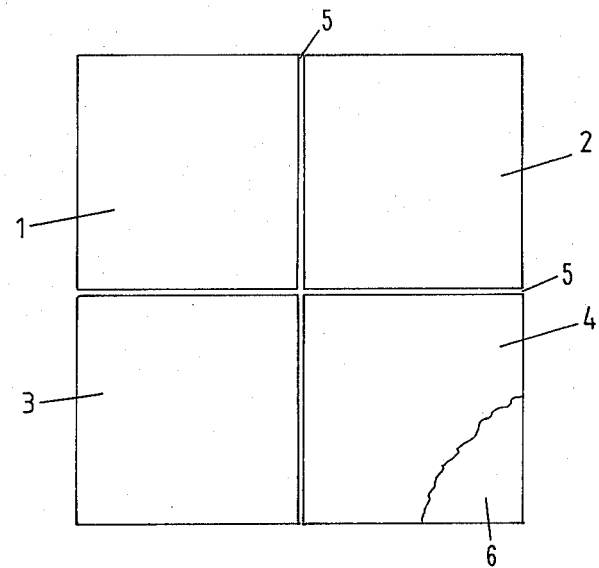
FIG. 1 shows a preferred form of the present invention showing a complete presentation of the preferred four portion means, each of which portion is attached to at least one other portion by a flexible hinging region.

As shown in FIG. 1 there are four portions which are substantially square or rectangular in appearance, 1, 2, 3 and 4. Portions 1 and 2 are hingedly connected by an integral vinyl portion 5 to other portions while portions 3 and 4 owing to a split therebetween are hingedly connected to one other portion only.

Figure 2:
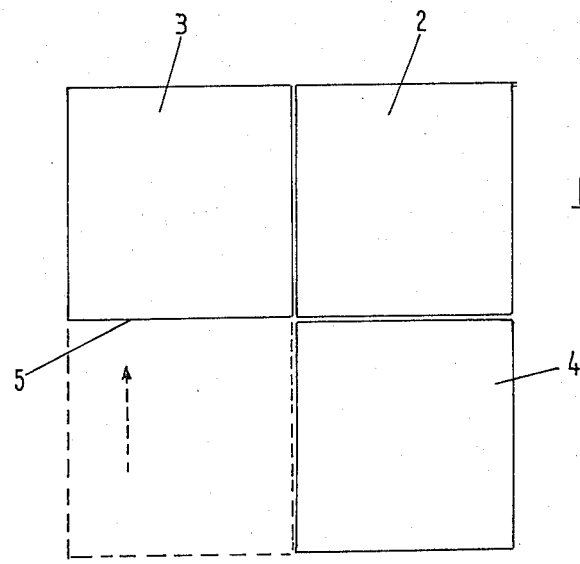
FIG. 2 shows one folded form of the means of FIG. 1.
Figure 3:
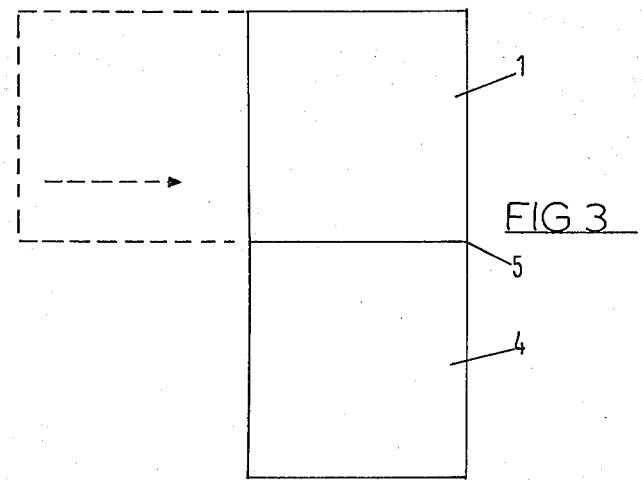
FIG. 3 shows a more folded form of the means.
Figure 4:
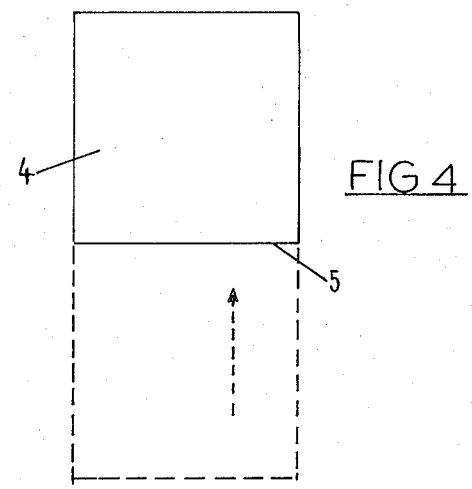
FIG. 4 shows the most folded form of the means.

To understand the operation of the present invention, it is necessary only to consider the collector as shown in FIG. 1 laid out at the shallow end of the swimming pool where it is more likely to receive sufficient light than it would if at the deep end. Consider that the surface shown in FIG. 1 is all black, i.e. the more favoured light absorptive side. A consideration of FIG. 2 therefore, will show a form where portion 3 has been folded about its connection with portion 1 thereby effectively reducing the black surface of the overall means by half, i.e. the side of portion 3 which is presented to the sun is now the aqua coloured portion which is not highly light aborptive. The direction of the folding in subsequent FIGS. 3 and 4 and in FIG. 2 is determinable by considering the original layout, i.e. the layout in the preceding figure shown in dotted outline with the direction of the folding means being shown by a dotted arrow. FIG. 3 therefore shows a subsequent folding which folds portion 1 over both portions 3 and 2 to thereby reduce the effective light absorbing surface to ¼ or almost ¼ of that of the means when in its FIG. 1 configuration FIG. 4 shows portion 4 folded over portions 1, 2 and 3 to thereby present the aqua surface only. Hence a perusal of FIGS. 1 to 4 will show that it is possible by the simple folding to present four black portions, two black portions or one black portion. If necessary it should be appreciated that three black portions could also be provided, for example by folding portions 1 and 3 over portions 2 and 4 respectively. Once in that condition portion 3 could be folded over portion 1 and then the overlapped portions 3 and 1 could be removed from their overlapping relationship with FIG. 2 thereby providing only three portions capable of effectively receiving the sun's light and passing it onto the water in the vicinity.

The preferred form of the present invention is described by way of illustration only. It is envisaged however that the whole pad of vinyl be substantially ¼" thick except for the hinging regions which may be reduced in section.

As it is desirable for the various portions to be substantially rigid ideally each includes a sheet of 30/1000" thick galvanised steel 6 sandwiched and sealed in between 20/1000" thick sheets of vinyl chloride plastic. Preferably the plastic extends 2" beyond each edge of each of the four metal sheets, such extensions being melded by for example, microwaves. Such dimensions mean each hinging region is about 4" wide. The sheets of plastic would be black and aqua. Ideally the side of the unfolded means, i.e. as in FIG. 1 is 12'. Hence it is possible by the folding technique to present selectively 144 sq ft., 108 sq ft., 72 sq ft., 36 sq ft., or no square feet of the black light absorptive surface to the sun while the pad lies at the bottom of the pool. This control of the base level of heating to the pool is important, i.e. it is preferable that any ancilliary heating component of the pool need only intermittently come in to raise the temperature of the pool. This is far more preferable than having to cool the pool. Hence it is possible to vary the configuration of the vinyl pad as the weather varies in order to ensure a more stable temperature which is obtained using a minimum if any, source of heating. It is believed therefore that apparatus in accordance with the present invention can be manufactured fairly economically and owing to their non-light absorptive aqua side would not be unduly detrimental in use to the overall aesthetics of a pool, while at the same time in this more energy conscious world, providing means whereby a pool can be heated as required. Moreover its substantially thin flat configuration is unlikely to interfere with the normal use of the pool. It is believed therefore such pads will find a widespread commercial acceptance.

What is claimed is:

1. A water immersible solar heat collecting means comprising an array of substantially laminar members with one side having a higher light absorbence than the other, each of which laminar member is of a configuration and sufficient density to lie flat on the bottom of a water filled swimming pool, hinge means connecting at least one edge of each member to an edge of another member to provide a unitary structure capable of being laid out in a flat position with the higher light absorbence surface of all of said members facing upwardly and of being rearranged by folding said members about said hinge means to selectively vary the number of members having their higher light absorbence surface facing upwardly, at least one of said laminar members has two edges each connected by a said hinge means to an edge of different laminar members, wherein two of said edges are normal with respect to each other, wherein there are four laminar members two of which have one said hinge means and two of which have two said hinge means one of the hinge means being located between the two laminar members having two hinge means.

2. A collecting means as claimed in claim 1 wherein said edges are straight edges.

3. A collecting means as claimed in claim 2 wherein each laminar member is substantially rectangular.

4. A collecting means as claimed in claim 1 wherein said members are substantially identical in size and configuration.

5. A collecting means as claimed in claim 1 wherein each laminar member is substantially rigid and said hinge means provide for folding said members in both directions so as to allow either overlapping or underlapping thereof.

6. A collecting means as claimed in claim 5 wherein each said laminar member includes a layer of metal and a layer of flexible plastic material, said plastic material serving as said hinge means.

7. A collecting means as claimed in claim 6 wherein each laminar member is comprised of a layer of metal covered on both sides with a layer of flexible plastic material of vinyl chloride.

8. A collecting means as claimed in claim 7 wherein said side having a higher light absorbence is colored black and said other side is colored aqua.

* * * * *